US012521268B2

(12) United States Patent
Göbel (10) Patent No.: US 12,521,268 B2
(45) Date of Patent: Jan. 13, 2026

(54) CATHETER DEVICE FOR ODOR-REDUCING DELIVERY AND/OR DISCHARGE OF SUBSTANCES TO/FROM THE HUMAN OR ANIMAL BODY

(71) Applicant: Advanced Medical Balloons GmbH, Waghäusel (DE)

(72) Inventor: Fred Göbel, Speyer (DE)

(73) Assignee: Advanced Medical Balloons GmbH (DE)

( * ) Notice: Subject to any disclaimer, the term of this patent is extended or adjusted under 35 U.S.C. 154(b) by 342 days.

(21) Appl. No.: 17/921,785

(22) PCT Filed: Apr. 28, 2021

(86) PCT No.: PCT/IB2021/053539
§ 371 (c)(1),
(2) Date: Oct. 27, 2022

(87) PCT Pub. No.: WO2021/220197
PCT Pub. Date: Nov. 4, 2021

(65) Prior Publication Data
US 2023/0165701 A1  Jun. 1, 2023

(30) Foreign Application Priority Data
Apr. 28, 2020 (DE) .................... 10 2020 002 764.4
May 18, 2020 (WO) .................. PCT/IB2020/054684

(51) Int. Cl.
*A61F 5/44* (2006.01)
*A61L 29/08* (2006.01)
(Continued)

(52) U.S. Cl.
CPC .............. *A61F 5/44* (2013.01); *A61L 29/085* (2013.01); *A61L 29/14* (2013.01);
(Continued)

(58) Field of Classification Search
CPC .......... A61F 5/44; A61L 29/085; A61L 29/14; A61L 2209/22; A61M 25/0017;
(Continued)

(56) References Cited

U.S. PATENT DOCUMENTS

| 5,490,839 A | 2/1996 | Wang et al. |
| 6,033,390 A | 3/2000 | Von Dyck |

(Continued)

FOREIGN PATENT DOCUMENTS

| EP | 0214721 | 3/1987 |
| EP | 0625343 | 11/1994 |

(Continued)

*Primary Examiner* — David R Deal
(74) *Attorney, Agent, or Firm* — Pandiscio & Pandiscio (57) ABSTRACT

The invention describes a specific, multilayer tubular film for the manufacture of catheter devices that are usable in the most odor-neutral manner possible. The passage of substances through the film wall may be reduced or avoided by incorporating suitable barrier layers. The delivery of strong-smelling active substances and also the discharge of intensely odorous excretions or secretions may be optimized in a problem-solving manner by proportional layers of EVOH- or PVDC-based materials, for example, in the multilayer film structure. The invention combines these barrier layers with mechanically loadable carrier layers made of polyurethane (PUR). PVC, or also polyamide (PA) or PA-related material layers, for example. The invention describes, among other things, embodiments of catheters having retaining balloon components that are equipped with odor-inhibiting layer portions over the entire intracorporeal and extracorporeal surface of the catheter and that thus provide maximum protection against release of odors. The invention further describes embodiments that are manufacturable in a particularly advantageous manner, with several of the components that make up the catheter being manu- (Continued)

factured by simultaneous forming from a single film tube blank.

24 Claims, 7 Drawing Sheets

(51) Int. Cl.
  *A61L 29/14* (2006.01)
  *A61M 25/00* (2006.01)
  *A61M 25/10* (2013.01)

(52) U.S. Cl.
  CPC .... *A61M 25/0017* (2013.01); *A61M 25/0045* (2013.01); *A61M 25/10* (2013.01); *A61M 25/1002* (2013.01); *A61L 2209/22* (2013.01); *A61M 2202/068* (2013.01); *A61M 2210/1067* (2013.01)

(58) Field of Classification Search
  CPC .............. A61M 25/0045; A61M 25/10; A61M 25/1002; A61M 2202/068; A61M 2210/1067
  USPC ........................................................ 138/118
  See application file for complete search history.

(56) References Cited

U.S. PATENT DOCUMENTS

| | | |
|---|---|---|
| 2008/0092902 A1 | 4/2008 | Schnell |
| 2010/0006102 A1 | 1/2010 | Schnell et al. |
| 2010/0324540 A1* | 12/2010 | Paulen ................ A61M 27/008 604/544 |
| 2011/0125114 A1 | 5/2011 | Bekele |
| 2013/0060212 A1 | 3/2013 | Hanuka et al. |
| 2014/0358126 A1 | 12/2014 | Göbel |
| 2015/0282978 A1 | 10/2015 | Henderson |
| 2015/0290434 A1 | 10/2015 | Lin et al. |

FOREIGN PATENT DOCUMENTS

| | | |
|---|---|---|
| EP | 1514528 | 3/2005 |
| WO | WO 2008/052018 | 5/2008 |
| WO | WO 2009/144028 | 12/2009 |
| WO | WO 2011/138731 | 11/2011 |
| WO | WO 2011/142928 | 11/2011 |
| WO | WO 2013/026564 | 2/2013 |
| WO | WO 2013/056013 | 4/2013 |

* cited by examiner

CATHETER DEVICE FOR ODOR-REDUCING DELIVERY AND/OR DISCHARGE OF SUBSTANCES TO/FROM THE HUMAN OR ANIMAL BODY

REFERENCE TO PENDING PRIOR PATENT APPLICATIONS

This patent application is a 371 national stage entry of pending prior International (PCT) Patent Application No. PCT/IB2021/053539, filed 28 Apr. 2021 by Advanced Medical Balloons GmbH for CATHETER DEVICE FOR THE ODOUR-REDUCING DELIVERY AND/OR DISCHARGE OF SUBSTANCES TO/FROM THE HUMAN OR ANIMAL BODY, which patent application, in turn, claims benefit of: (i) German Patent Application No. DE 10 2020 002 764.4, filed 28 Apr. 2020 and (ii) International (PCT) Patent Application No PCT/IB2020/054684, filed 18 May 2020.

The three (3) above-identified patent applications are hereby incorporated herein by reference.

FIELD OF THE INVENTION

The invention is directed to a catheter-like device for the medical delivery and/or discharge of substances that are particularly odor-intensive, particularly soluble, or otherwise capable of migration, comprising a balloon component that anchors and retains a device that is placed in an organ or in a body interior space, a delivering and/or discharging tube unit that adjoins the balloon component and leads transluminally to the organ or to the interior space, and an extracorporeally adjoining tube-like portion.

BACKGROUND OF THE INVENTION

Catheters for the continuous discharge of stool from the rectum of a patient are presently an established component of intensive medical care. Stool drains having a conventional design are made up of a toroidal balloon that anchors the catheter resting on the base of the rectum, and a stool-discharging tube element which carries the balloon torus and extends through the anal sphincter muscle, and which in an extracorporeal extension connects to a collection container situated at that location.

Conceptually, stool-discharging drainage devices having the described simple design are not able to discharge low-viscosity stools through the sphincter muscle while reliably remaining closed, i.e., without leakage of stool. Contamination of the perianal skin areas and contamination of the direct care setting of the patient cannot be prevented. The problem of sealing the anal sphincter muscle remains completely disregarded in the design of this type of device. For normal tonus of the sphincter muscle resting against the tube segment, the stool-discharging tube segment passing through the anal canal merges into a radial fold, the tube segment forming rough, longitudinally extending channels within the anal canal that allow the liquid intestinal contents to drain from the rectum into the perianal area. To limit the transanal drainage of stool, in some versions of this design a particularly thin-walled, soft transanal tube segment has been integrated. Although the resulting radial folding of the tube wall is less rough, the drains equipped in this way promote axial twisting of the tube segment, which easily results in complete closure of the stool-discharging lumen.

Conventional stool-discharging drains, in the intracorporeal stool-receiving head part as well as in the stool-discharging extracorporeal tube portion, are generally made entirely of silicone.

Silicones, in particular when processed to form thin-walled balloon and tube structures, have very little capability for preventing, or reducing to a tolerable level, the release of odor-intensive substances. When native, uncoated, or otherwise untreated silicone-based components are exposed to liquid stool, for example, even after a few hours, extremely intensive odor may develop at the surfaces facing the surroundings. The odor emanating from the system may be so unpleasant for the patient and for the user that the continuous stool discharge must be discontinued.

For this reason, manufacturers therefore often provide silicone-based stool discharge systems, in the region of the extracorporeal tube segment, with barrier-effective auxiliary substances that inhibit the passage of odorous substances, absorb odorous substances, or neutralize odorous substances in order to keep the stool odor within an acceptable range.

For some years, innovative stool discharge systems having seal-optimized, transanally sealing head units made of polyurethane (PUR) have been known on the market, such as Hyghtec® basic-plus from Creative Ballons GmbH, Waghäusel, Germany. For the extracorporeal stool discharge to the collection container, this type of drain includes an optional discharge tube made of PUR or PVC. Native PUR and native PVC, as well as compounds or coextrusions of the two materials, have likewise proven to have inadequate odor-proofing during extended residence times in the body.

While the transanally positioned head unit of this innovative design is situated almost completely within the body of the patient, and only a small, spherically expanded segment of the transanal balloon body protrudes from the anus, the stool-discharging tube unit leading to the collection bag develops a much larger odor-effective total surface area of approximately 1400 $cm^2$, starting from a tube diameter of 2.5 cm and a tube length of 180 cm. For continuous stool-discharging systems, the stool-discharging extracorporeal tube unit must be regarded as the primary source for the release of stool odor. The collecting container as well as the balloon portion, visible preanally, play a subordinate role.

SUMMARY OF THE INVENTION

These disadvantages of the prior art have resulted in the object of the invention, to refine a generic catheter-like device in such a way that no stool odor is released during extended, for example multi-day, retention in a patient.

The object is achieved within the scope of a generic catheter-like device, in that at least the extracorporeal tube-like portion is formed from a multilayer film, the multilayer film including at least one barrier layer made of an odor-proof barrier material and at least one carrier layer made of some other, mechanically stable material, the wall thickness of the carrier layer being greater than the wall thickness of the barrier layer.

The present invention thus describes technical approaches to curb or avoid to the greatest possible extent a release of odor during the continuous discharge of stool or also other odor-intensive excretions or secretions or other body fluids. The invention also encompasses the odor-reducing or odor-avoiding delivery of similarly odor-intensive substances to the body.

The invention preferably provides technical solutions for the extracorporeal delivering and/or discharging tube portion of the catheter device, but also relates to other odor-releasing surfaces of the catheter device and of the collection bag.

The described tube and film technology is based on the use of multilayer material combinations, with polyurethane (PUR) or thermoplastic PUR (TPU), for example, as particularly resistant and mechanically robust carrier material, being combined with EVOH (ethylene-vinyl copolymer) or PVDC (polyvinylidene chloride), in each case as proven odor-proof barrier materials, to form multilayer film structures. Due to their chemical properties, EVOH and PVDC are not combinable with silicone, and in particular are not manufacturable as a multilayer coextruded film or also as a multilayer laminated film.

The multilayer tubular films presented within the scope of the present invention include one or more layers of a mechanically loadable, preferably elastically deformable and elastically straightening, carrier material, with thermoplastic polyurethanes (TPUs) preferably being used. Less preferably, PVC, polyamide (PA), Pebax, or also polyolefin-based polymers, for example, may also be used.

As an example, the particular tubular film material may be made up of a sandwich-like combination of PUR on the interior and exterior sides, and a centrally situated layer made of EVOH or PVCD. While the barrier properties of EVOH degrade upon exposure to water, PVDC is resistant to an aqueous environment and may therefore optionally also be used in a two-layer material composite together with PUR or PVC, for example, without loss of its barrier effect. For a three-layer or multilayer film structure, PVC and PUR, either as an inner layer or outer layer, may be arranged around the central barrier layer.

The invention describes in particular the design of odor-inhibiting to odor-proof delivering and/or discharging tube structures, as are installed in the delivering or discharging tube segment, for example, and that connect the stool-receiving head unit that is placed in the patient to a bag unit situated outside the body. For stool-discharging systems, the corresponding tube segments preferably have a thin-walled design, so that even with a small external application of force they collapse to form flat, band-like structures and thus prevent the development of pressure-related lesions on the skin of the patient, in particular when the trunk or the extremities of the patient temporarily rest(s) against the tube segment. In the preferred design of the tube, the tube spontaneously elastically straightens, at least partially, when the external application of force decreases. This type of straightening behavior may ideally be achieved by using PUR as the carrier material. For example, PUR or TPU types having a Shore hardness of 80A to 95A and 55D to 65D are used. The diameter of such elastically acting tube segments that are provided with a PUR carrier layer, for example for stool-discharging systems, is in the range of 15 to 30 mm, preferably 20 to 25 mm. The wall thickness of the tube component is typically in the range of 200 to 400 μm. The thickness of the barrier layer, made of EVOH, for example, is approximately 5 to 25 μm, preferably 10 to 15 μm.

The spontaneous straightening or rounding of the cross section after a temporary deformation of the stool-discharging tube segment due to an externally acting force on the tube may be assisted by successive ring-shaped, convex or concave protrusions or indentations of the tube wall. For the above-mentioned PUR-based material hardnesses, wall thicknesses, and tube diameters, such circular expansions or reductions of the tube casing are preferably 3 to 6 mm wide, and have deflections of the tube diameter of 1.0 to 3 mm, preferably 1.0 to 2.0 mm, at the apex. In the preferred design, the deflections are in each case arch-shaped or convexly or concavely curved.

When only a PVC-based carrier material in combination with an EVOH- or PVDC-based separating layer is used, the PUR-typical elastic straightening properties of the tube casing, preferred within the scope of the invention, are not achievable or are achievable only to a small extent. However, for a proportional use of PVC, for example as the inner layer, the capability for elastic self-straightening may be integrated by accommodating an additional PUR layer in the film wall. The PUR used then preferably has a higher Shore hardness relative to the PVC used, in the range of Shore 90A or also Shore 55D, for example. For a sought total wall thickness of 200 to 400 μm of the tubular film wall for a stool-discharging drainage tube, by way of example the following arrangement of material layers may be combined: outer—PUR 55D (50-100 μm), center—EVOH or PVDC (10-20 μm), inner—PVC 60A-80A (140-280 μm). Within the scope of the invention, a PVC layer that inwardly faces the drainage lumen is conceptually advantageous, since the barrier effect against water that is achievable with PVC exceeds the corresponding barrier effect of a PUR layer having the same wall thickness. When EVOH is used as the centrally situated barrier layer, protection from water molecules is advantageous, since the barrier effect of EVOH is reduced by exposure to water.

PUR-based material layers provide the multilayer components of the catheter device, formed from tubular films, described within the scope of the invention, with high mechanical stability and load-bearing capacity. Even thin-walled proportional PUR layers in the range of 10 to 30 μm impart significantly better tensile strength and tear strength, as well as cut resistance and puncture resistance, to the particular component in comparison to PVC, for example.

The carrier materials PUR and PVC used for the film structure are adherable using common solvents such as cyclohexanone or tetrahydrofuran, which is crucial for the simple installation of a catheter device made up of multiple, separately manufactured assemblies. In the preferred designs of the catheter device described here, which is optimized for odor-proofing, the stool-discharging tube segment is connected between a distal, completely PUR-based head unit placed in the rectum, and a proximal, extracorporeal connector element made of PUR, ABS, or PVC, for example, in each case via solvent adhesion.

In addition to EVOH or PVDC, proportional layers of polyamide (PA) or Pebax (TPE-A polyamide) may also be provided in a multilayer film according to the invention as a less effective odor barrier. The odor barrier properties of PA do not achieve the efficiency of EVOH or PVDC, but are advantageously usable, in particular for fairly short application times of a catheter device according to the invention.

Combinations of EVOH and PA are particularly advantageous, since both materials, in particular in coextrusion processes, may be joined well, and generally without a connecting, adhesion-assisting so-called tie layer.

Layer combinations of PA and PUR, which likewise provide the option for coextrusion without adhesion-promoting tie layers, are also suitable. By use of such an adhesion promoter as an intermediate layer, joining of PA to PE-based layers is in turn possible.

The tubular film blanks, which are extruded in multiple layers and used for manufacturing the catheter components, may be thermally formed in a subsequent manufacturing step, for example using a hot molding process; the unprocessed tube blank is expanded into a heated mold cavity via action by compressed air, and its shape is fixed there via subsequent cooling of the mold. In addition to such forming of the extracorporeal stool-discharging tube segment to form a tube casing that is provided, for example, with lumen-stabilizing expansions or indentations, the invention also includes embodiments in which, in addition to the formation of the stool-discharging tube segment, formation of the intracorporeal shaft tube component and optionally also of the intracorporeal balloon component of the device takes place at the same time. The invention describes embodiments of the catheter device in which the total intracorporeal portion and also the total extracorporeal portion of the catheter are formed from a single, structurally continuous film tube blank.

The described film blanks may be manufactured by direct multilayer extrusion to form the tube, but may optionally also be further processed as a flat film to form the film tube. In addition, multilayer dipping processes are conceivable, the respective material layers being applied successively from the inside to the outside.

BRIEF DESCRIPTION OF THE DRAWINGS

The design features of the invention are illustrated in an explanatory manner in the following figures, which show the following.

DETAILED DESCRIPTION OF THE PREFERRED EMBODIMENTS

Figure 1:
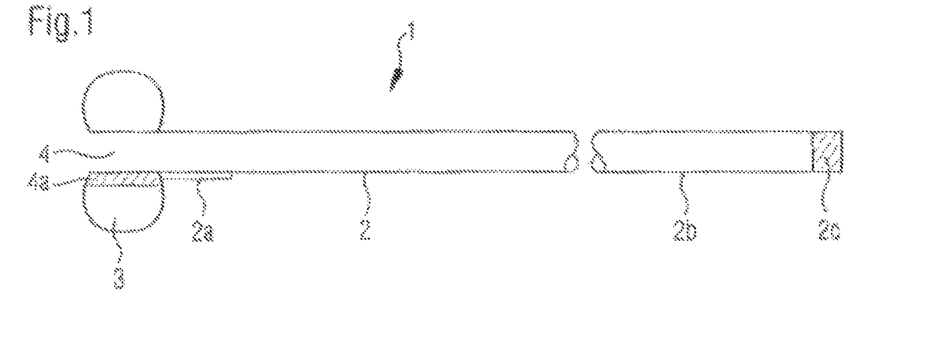
FIG. 1 shows an example of a catheter device that is structurally designed for the continuous transanal discharge of stool, made up of a transanal and extracorporeal stool-discharging tube component and a rectally placed head unit with a retention balloon.

FIG. 1 shows a schematic longitudinal section of the design of a catheter-like device 1 according to the invention, which in the illustrated embodiment is conceptually suitable for the continuous discharge of stool from the rectum of a patient into an extracorporeal collection container. The design essentially corresponds to that of conventional silicone-based stool drains.

The catheter device is made up of a tube-like segment 2 on which a balloon body 3 having an anchoring (retaining) action rests at the distal, rectally positioned end. In one particularly simple embodiment of this design, the toroidal/ring-shaped balloon body has no reinforcement that keeps the stool-receiving orifice 4 of the device open for receiving and discharging intestinal contents. Whereas for silicone-based drains the opening of the orifice is ensured by an elastic expansion of the torus-shaped balloon body that is directed radially outwardly on all sides, with not only the outer diameter of the balloon torus increasing, but also the diameter of the stool-receiving, central opening expanding and thus stabilizing it, such a lumen-maintaining or -stabilizing effect is not present for materials having little or no elasticity. When the balloon is acted on by filling pressure, this results in a collapse, directed toward the balloon center, of the tube lumen carrying the balloon, and thus results in closure of the opening. The present invention counteracts this inwardly acting force with an outwardly acting, elastic self-straightening of the balloon-carrying tube segment.

In contrast to relatively thick-walled balloon components made of silicone that elastically expand to working dimensions to be achieved, materials with little or no volume expansion capability, such as thermoplastic polyurethanes (TPUs) in the hardness range of Shore 80A to 95A and 55D to 65D, on the one hand allow the complete formation of the balloon body to its working dimensions, necessary for functioning, during manufacture, and on the other hand allow very thin wall thicknesses in the low micron range of approximately 15 to 35 μm. The use of TPU thus allows manufacture of particularly thin-walled balloon geometries having complex designs, which due to the low material compliance (volume extensibility) [have] reliable dimensional stability despite very small wall thicknesses, even under high forces that act in situ on the balloon. Since an elastic expansion of the balloon wall is not necessary, the filling pressures needed for functioning in the body may be relatively low, and in the case of the rectal stool discharge, for example, may approximate the physiological organ pressure that prevails in the rectum. This option is suitable in particular for an incomplete, loosely tension-free filling of the balloon.

Other designs of silicone-based stool discharge systems include, in the orifice region of the drain, cylindrically shaped, elastically deforming and straightening, reinforcing sleeve-like components 4a whose elastic capability for circular straightening outweighs the filling pressure, prevailing in situ in the balloon body, up to a certain pressure value that causes the radial collapse of the reinforcing component.

As a further structural variation of silicone-based stool drains, designs are known in which the intrarectal retention balloon, in transanal positioning, is directly proximally adjoined by a stool-discharging tube segment 2a that is made of a particularly thin-walled and/or also particularly soft silicone, as the result of which in particular the mechanical irritation of the mucosa of the anal canal by the tube casing that moves relative to the anus and has an abrasive effect is reduced. However, during the course of the application, this structural adaption of the transanal tube segment promotes axial twisting of the tube, which may result in the partial or complete closure of the discharging lumen.

Stool drains manufactured from silicone are sometimes provided with additional material layers that inhibit the release of odor and/or that bind odor. Due to the generally pronounced rigidity of the barrier materials used, such as parylene, the segment of the device that receives the stool within the rectum and leads through the anal canal is typically not provided with such odor-reducing material layers or material modifications.

The proximal tube segment 2b at the free end of the stool-discharging catheter merges into a connector element 2c which allows a collection bag to be connected or changed.

Figure 2:
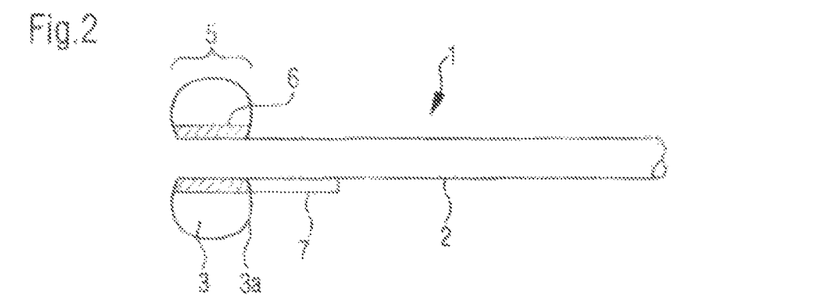
FIG. 2 shows a drain having the design according to FIG. 1, both the stool-receiving intracorporeal portion and the stool-discharging extracorporeal portion of the tube component being made of multilayer film material, and the film integrating at least one odor-proof barrier layer.

FIG. 2 shows a design according to the invention of a stool-discharging catheter device 1, which is conceptually based on the conventional design described above. The toroidal/ring-shaped head unit 5 that receives the stool in the rectum and anchors the drain at that location includes a deformable, spontaneously elastically straightening, cylindrical or tubular inner body 6 in the interior of the balloon compartment 3. During manufacture, the balloon body 3a has already been formed to its complete dimensions necessary for the rectal retention. The balloon body is internally closed off in a fillable manner with respect to the compartment by a closing inner body 6. The balloon body in a proximal direction merges into a stool-discharging, transanal tube portion 7 that leads the stool through the anal canal.

In the sense of the sought reduction in the release of odor, in the described design all components that are exposed to the patient's stool are provided in a multilayer design that integrates an odor-proof or odor-reducing barrier layer. This includes the balloon body, the balloon-carrying inner body, and the stool-discharging tube that extracorporeally adjoins the head unit.

In one structural modification of this design of a catheter device, which is provided on all sides with an odor-reducing barrier layer, it is also possible for only the discharging tube 2, or additionally the inner body 6 that carries the balloon, to have a corresponding odor-inhibiting or odor-proof design.

To avoid permanent stretching of the balloon body due to high filling pressure, or to allow the option for slack, largely pressure-passive, atraumatic filling of the balloon, and at the same time to ensure a sufficient opening of the drain orifice, the tube inner body carrying the balloon is provided with the capability for elastically acting, spontaneous straightening. It is functionally advantageous when the tube segment leading through the anus, proximally adjoining the balloon-carrying tube inner body, is likewise provided with the capability for elastic deformation and straightening, wherein the transanal tube segment, due to the applied action of force of the sphincter, is to be collapsed to a relatively smaller diameter, and when the action of force is once again reduced, straightens from the collapsed state into its formed starting state. The transanal segment 7 of the device thus adapts to the particular tonus or opening state of the sphincter muscle.

It is also functionally advantageous when not only the intracorporeal, but also the extracorporeal, stool-discharging tube portion of the device has the capability for spontaneous elastic straightening. Lumen-closing, adhesive effects of the wetted tube inner surfaces may thus be reduced or avoided in the region of the extracorporeal stool discharge. A corresponding lumen-straightening effect is achieved by installing appropriately elastic material layers in the tube component. A lumen-straightening effect may also be assisted by ring-like expansions or indentations of the tube casing extending in a circle around the circumference.

The lumen-straightening properties of the inner body carrying the balloon are preferably set in such a way that in the freely filled state outside the body, for a balloon filling pressure of 50 mbar, no inwardly directed radial invagination or enfolding of the wall of the inner body results.

Figure 3:
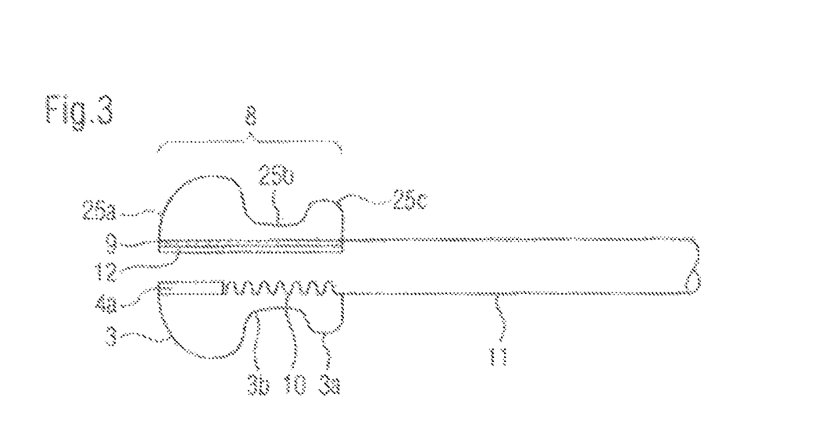
FIG. 3 shows a particular design of a drainage head unit, having a dumbbell shape or also a mushroom shape, the rectally anchoring balloon portion continuing into a balloon portion that extends into the anal canal or through same.

FIG. 3 shows a stool-discharging catheter device, designed according to the invention, having a special head part 8 that is configured for the continuous transanal placement and sealing. The head part integrates a dumbbell-shaped, centrally tapered or fitted balloon body 3, or alternatively a mushroom-shaped balloon body, which rests on an inner body 9 that carries the balloon, and that is provided with the capability for elastically acting, radial folding or invagination, or for partial or complete collapse and/or an elastically acting axial compression or buckling and elastic restraightening.

The balloon body 3 has a central taper 25b that is placed within the anal canal; a distal end-position expansion 25a of the "dumbbell" in the rectum and a proximal end-position expansion 25c come to rest directly in the preanal region.

As a result, on the one hand an undesirable opening of the anal sphincter muscle with continuous dilation is prevented, and on the other hand, perforating injuries during a forced dislocation of the device directed into the rectum and sigmoid colon may be averted. To strengthen the elastic self-straightening of the shaft tube, it is preferably equipped with a special undulating profile 10, as the result of which the wall thickness of the inner body 9 may be reduced and the straightening properties of the tube may still be maintained. The undulating profiling (corrugation) allows approximately film-like, thin wall characteristics of the inner body to be achieved.

In the preferred design, the balloon body is manufactured by blow molding of PUR. During manufacture, the balloon body has already been provided with the dimensions and geometric shape characteristics necessary for the transanal positioning. The inner body 9 which carries the balloon, and which elastically deforms and self-straightens in the rectum and in the anal canal, in the preferred design extends completely through the anus.

Drains that include corresponding head units are described in WO 2013/026564, for example. In one modification of this particular design of a dumbbell-shaped rectally stool-receiving and transanally stool-discharging head unit that is transanally placed and that seals across the sphincter muscle, the balloon body 3 may also have a simplified mushroom shape; the balloon has no preanally positioned, spherically or discoidally expanded balloon segment 3*a*, and instead, the central tapered balloon segment 3*b* extends through the anus without expansion at the end position, and protrudes beyond the opening of the anus or ends in flush alignment with the outer opening of the anus. As an alternative to an undulatingly corrugated, ring- or spiral-shaped profile, the capability of the shaft tube, carrying the balloon, for elastic deformation and straightening may also be increased, or its straightening properties modified, by correspondingly acting elastic components 12, for example via separate sleeve-like or net-like components that are flatly connected to the shaft tube, or via net-like or spiral-shaped struts that are flatly integrated into the tube surface, or also by flatly connected gel-like or foam-like material layers.

The tube inner body of the head unit is adjoined extracorporeally by a delivering or discharging tube segment 11.

Based on the design described for FIG. 2, beyond the stool-discharging tube 11, the inner body 9 and/or the balloon body 3 may also be manufactured from odor-proof tube material according to the invention.

Figure 4A:
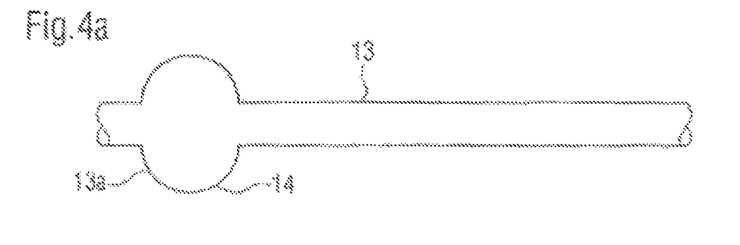
FIG. 4a shows a specifically formed tube blank having a spherical or discoidal/ring-shaped expansion at the end position for the manufacture of an odor-reducing catheter device having a particularly simple design.
Figure 4B:
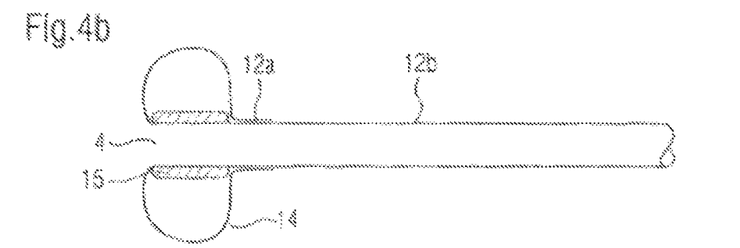
FIG. 4b shows a design of a stool drain that is manufactured from the blank depicted in FIG. 4a, the two tube ends being pulled back into themselves, thus creating a toroidal/ring-shaped balloon compartment that is fillable from outside the body.

FIG. 4*a* describes one embodiment of a catheter device according to the invention that has a particularly simple design and is advantageously manufacturable in a cost-effective manner, and whose basic structure is made up of a single thermally formed tube body 13. The distal end 13*a* of the tube body has a spherical or discoidal expansion as a preform of the balloon 14. Pulling back the expansion over the proximal portion of the tube body results in a torus-shaped, extracorporeally fillable compartment 14 in the form of a balloon 3, 3, as illustrated in FIG. 4*b*.

The orifice of the drain pointing toward the rectum is held open by an elastically deformable and elastically straightening sleeve element 15 that is inserted into the central lumen of the toroidal balloon. Stool-discharging systems having such simple designs are described in WO 2009/144028, for example. In principle, the central lumen of the toroidal balloon 3, 3*a* may be designed without an additional lumen-stabilizing sleeve element. In this case, the tube body 13 itself has sufficiently strong, elastically acting self-straightening properties that maintain the drainage lumen.

Figure 4C:
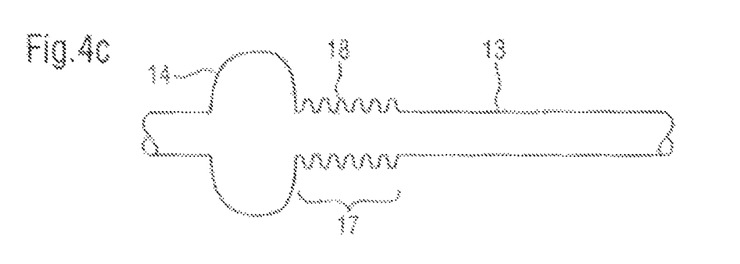
FIG. 4c shows a tube blank that is formed according to FIG. 4a, including a segment that directly laterally adjoins the expansion that is formed at the end position, and including an undulating profile that stabilizes the tube lumen.
Figure 4D:
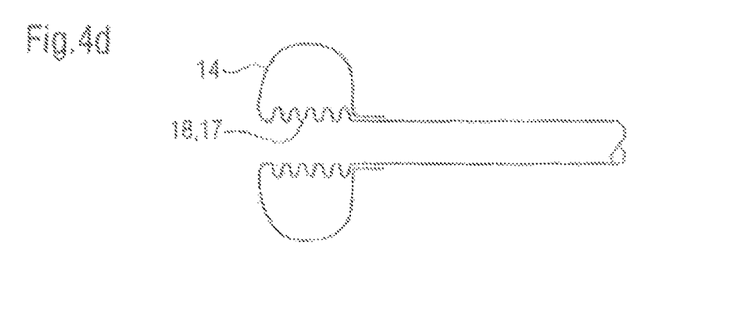
FIG. 4d shows a design of a stool drain that is manufactured from the blank depicted in FIG. 4c, the two tube ends being pulled back into themselves, and the undulating segment coming to rest inside the ring-like fillable compartment, and at that location acting in a stabilizing manner on the stool-receiving lumen of the drain.

FIG. 4*c* shows a design based on FIG. 4*a*, the capability for lumen-maintaining, elastic self-straightening of the tube 13 in the segment 17 that is enclosed by the fillable balloon being assisted by a ring- or spiral-shaped profile 18 molded into the tube wall. During the pulling back of the expansion 14 of the tube body at the end position, illustrated in FIG. 4*d*, the lumen-maintaining tube profile thus modified comes to rest in the interior space 14 of the balloon.

Figure 4E:
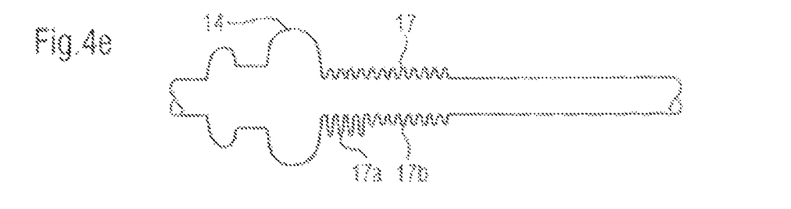
FIG. 4e shows a further forming blank including on the one hand a dumbbell-shaped, balloon-like expansion, and on the other hand an undulating profile that laterally adjoins the expansion, and that when placed in the body extends into the anal canal or through same.
Figure 4F:
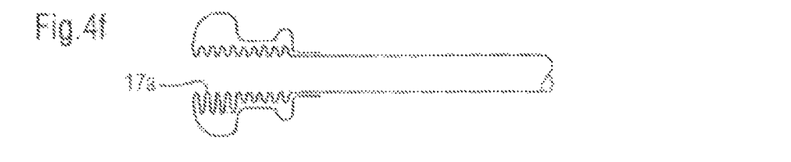
FIG. 4f shows a design of a stool drain that is manufactured from the blank depicted in FIG. 4e, the two tube ends being pulled back into themselves, and the undulating segment coming to rest inside the dumbbell-shaped balloon compartment, and at that location acting in a lumen-stabilizing manner on the drainage lumen.

FIG. 4*e* shows corresponding undulatingly corrugated profiling of the shaft tube for transanally or also intra-anally positioned or sealing head units. The area 17 that is lumen-stabilized by spiral-shaped or ring-like profiling, after the dumbbell- or mushroom-shaped expansion 14 is pulled back, is situated in the interior of the fillable compartment, as illustrated in FIG. 4*f*. In this structural design, the portion of the profile close to the orifice may be provided with corrugation 17*a* that is particularly closely spaced and/or that has a high amplitude, and that has correspondingly more intense self-straightening and that is less prone to radial collapse, while the portion 17*b* that is placed in the anal canal, relative to the portion 17*a*, ensures less intense straightening, so that under a continuously acting force the structures of the anal canal are subjected to less stress and the adjacent tissue is protected.

With this design, in particular in the area of the rectally placed segment of the head unit of the device, additional lumen-stabilizing or -straightening components may be dispensed with, which allows a corresponding cost advantage in manufacturing the catheter device.

The lumen-straightening properties of the inner body carrying the balloon are preferably set by an appropriate combination of material types, material layer thicknesses, and specific undulation characteristics in such a way that in the freely filled state outside the body, for a filling pressure of 50 mbar prevailing in the balloon, no inwardly directed radial indentation of the wall of the inner body occurs.

Figure 5:
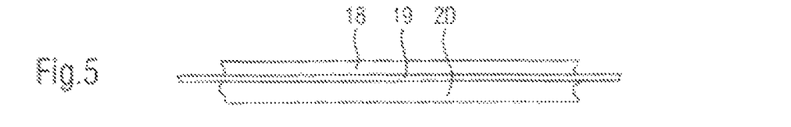
FIG. 5 shows an example of a schematic wall design of an odor-reducing multilayer tubular film or balloon film that includes an odor-proof barrier layer made of EVOH or PVDC.

FIG. 5 shows an example of a wall structure of the catheter-like device, the material types used and their specific physical properties being combined on the one hand in the sense of efficient and biocompatible functioning of the catheter, and on the other hand, in the sense of an efficient odor barrier. In this example design, the total wall thickness of the film used for manufacturing the device, as well as the material hardness and the thickness of its individual layers, are designed for the requirements of a stool-discharging catheter system that remains continuously in the rectum of the patient.

In the region of the intracorporeal and extracorporeal stool-discharging tube, optionally also in the region of the balloon body, the film material that is used is made up of a layer 18 made of polyurethane (PUR), followed by a centrally situated barrier layer 19 made of EVOH. This layer adjoins a layer 30 made of PVC.

The overall thickness of the tube wall is 200 to 400 µm, preferably 250 to 350 µm. The PUR portion 18 is preferably situated facing the outside and has a layer thickness of 200 µm, for example, and its material hardness is in the range of Shore 80A to 90A. The PUR on the one hand imparts the tube body with tensile strength and tear strength. On the other hand, the PUR portion provides the tubular film with the capability for elastic deformation and self-straightening. The centrally situated barrier layer 19 in the layer composite has a wall thickness of approximately 15 µm, and is preferably made of EVOH. The barrier layer minimizes the passing of water molecules, air constituents, and odor-intensive substances through the film wall. The PVC layer 20 is preferably directed inwardly, facing the tube lumen. The PVC has a Shore hardness of 60A to 80A and a layer thickness of approximately 100 µm. The PVC layer ensures a certain barrier against water molecules and to a certain extent shields the centrally situated EVOH layer from water, as the result of which the barrier effect of the EVOH is not impaired or reduced by the interaction with water molecules.

To manufacture the designs of the device described for the preceding figures, in which the retaining balloon portion in the rectum and also the transanal and/or extracorporeal stool-discharging tube segment are formed from a single tube blank, the invention proposes an adapted distribution of the above-mentioned proportions of material thicknesses. The PUR layer is increased to 280 µm, and EVOH or PVDC layer is increased to 40 µm. To internally shield the EVOH, a PVC layer having a reduced thickness of approximately 80 µm is used. This dimensional adaptation of the PUR layer thickness allows the geometrically stable, symmetrical blow molding of the rectal balloon-like expansion from the starting tube or blank used in the forming process, which is smaller relative to the balloon diameter. For an assumed jump in the tube diameter from 20-30 mm to a balloon diameter of approximately 60-70 mm, during the course of blow molding the thickness of the EVOH layer decreases from 40 µm to approximately 10 to 15 µm, which ensures the maintenance of the barrier function in the balloon or rules out critical thinning of the barrier layer. Correspondingly, the higher PUR portion at the total wall thickness of the crude tube to be formed ensures that the balloon portion when expanded has a sufficient mechanical load-bearing capacity, in particular dimensional stability, tear strength, and puncture resistance.

The described greater wall thickness of the outer PUR layer is advantageous in particular for the simultaneous blow molding of the balloon portion, and an undulatingly corrugated shaft tube that stabilizes the drainage lumen in the balloon-carrying region, from a single, continuous tube blank. The combination of the above-described PUR types and their proportional layer thickness, with a specifically undulated, ring- or spiral-shaped corrugated profile in the balloon-carrying section of the shaft tube that carries the balloon or that is enclosed by the balloon, assists with its capability for spontaneous straightening into the starting shape that was set during manufacture, and contributes to avoiding axially directed torsions of the tube.

Figure 6:
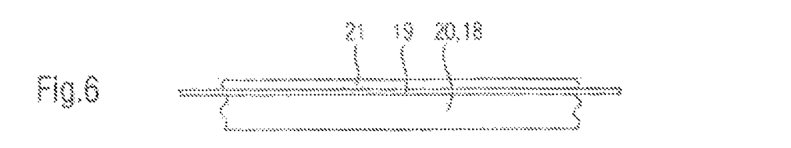
FIG. 6 shows a multilayer wall structure corresponding to FIG. 5, the odor-reducing barrier layer being made of polyamide (PA) or PA-related Pebax.

FIG. 6 describes a further example of a wall structure of a film-like tube material that odor-proofs or inhibits the release of odor, it being possible for the particular barrier layer made of EVOH or optionally PVDC to be combined with a mechanically stable carrier layer 21 made of polyamide (PA) or the polyamide-related material Pebax. An example combination of Pebax on the outside, a central layer made of EVOH, and an inner layer made of PVC 20 or PUR 18 is shown in the figure. For an overall thickness of 300 µm, for example, of the tubular film blank used in the thermal forming to produce the stool-discharging segment, the Pebax has a Shore hardness of 35D to 40D and a layer thickness of 80 µm. The central EVOH layer is 10 to 20 µm thick. The interior PVC or PUR portion of the film has a thickness of 200 µm.

Figure 7:
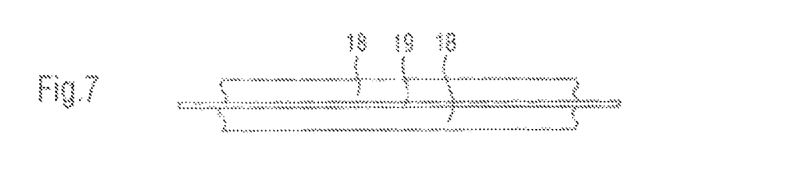
FIG. 7 shows a multilayer wall structure, a centrally situated barrier layer being enclosed on both sides by PUR layers.

FIG. 7 shows a further multilayer wall structure of the tubular film blank used for manufacturing the intracorporeal components, including the balloon body, the balloon-carrying inner body, and the extracorporeal stool-discharging tube. A central barrier layer 19 preferably made of EVOH, having a wall thickness of 5 to 20 µm, preferably 10 to 15 µm, is integrated between two carrier layers 18 made of PUR and having wall thicknesses of approximately 150 µm in each case. The material hardness of the PUR is set in the range of 80A to 95A and 55D to 65D. Various PUR hardnesses may be used when building up the tube blank on the outer side and inner side. Such combinations of softer PUR layers with harder PUR layers may be advantageously used in particular when special elastic straightening properties, in particular of the undulatingly corrugated or also uncorrugated balloon-carrying shaft tube segment or inner body, are to be achieved. To achieve optimal elastic deformation and restraightening, the wall thicknesses of the two individual layers may be correspondingly increased above 150 µm (for example, 250 µm for an 80A PUR type, outer) or decreased below 150 µm (for example, 50 µm of a 60D PUR type, inner). In addition, to avoid tackiness on the surface of the particular softer PUR carrier layers, which is typical of PUR, further thin-walled PUR layers having a higher Shore hardness, with a layer thickness of 5 to 10 µm, for example, may be applied, which in particular in the hardness range of Shore 55D and above do not exhibit such tackiness.

Figure 8:
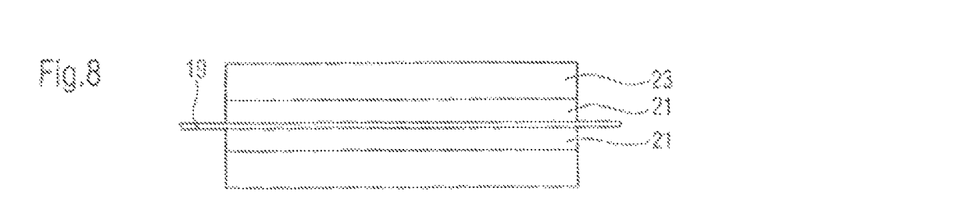
FIG. 8 shows a multilayer wall structure, a centrally situated barrier layer made of EVOH being supplemented in each case, toward the outside, by a sequence of PA, a tie layer, and one or more LDPE layers.

FIG. 8 describes a multilayer film structure, a centrally situated barrier layer made of EVOH 19 being supplemented by a PA layer 21 flanking on both sides. The two materials may generally be advantageously and easily combined in a coextrusion process. One or more layers of an LDPE material 23 are then joined via an adhesive layer (tie layer) 22.

Figure 9:
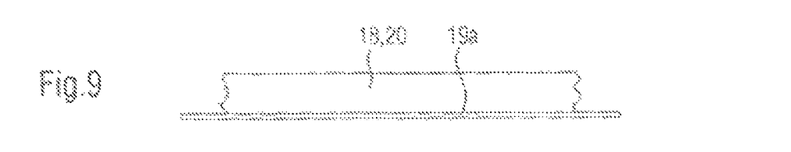
FIG. 9 shows a conceptual two-layer wall structure of an odor-reducing balloon film or tubular film, the barrier layer being made of PVDC or EVOH, and being combinable with a carrying layer made of PUR, PVC, or PA or Pebax.
Figure 10A:
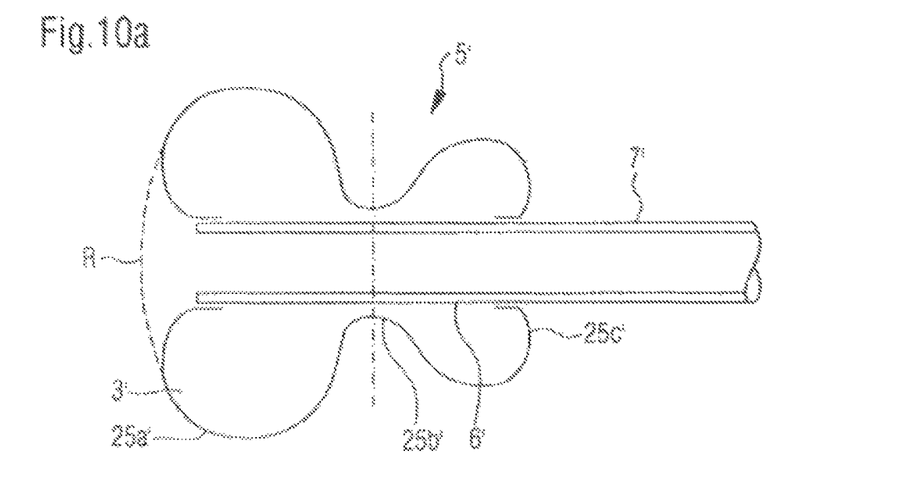
FIGS. 10a through 10j show special embodiments of drainage head units according to the invention, in each case in a longitudinal section.

FIG. 9 describes an example of a two-layer film combination that combines an EVOH- or PVDC-based barrier layer solely with a single carrier layer, i.e., that dispenses with a sandwich-like layer arrangement as described for the preceding figures. The barrier layer 19 has a wall thickness of 20 µm and is preferably provided as an outer surface. The inwardly directed carrier layer 24 is preferably made of PUR 18 or PVC 20, and for example is 200 to 280 µm thick. In the case of simultaneous formation of all constituents of the balloon component and the shaft tube component of the head unit and of the extracorporeal stool-discharging tube made from a single employed blank, the thickness of the barrier layer is increased to approximately 50 µm, and the proportional layer thickness of the carrier 18 or 20 is increased to a thickness of 250 to 300 µm;

FIG. 10a shows a design of a rectally stool-receiving and transanally passing head unit 5', including a dumbbell-shaped balloon component 3' that rests on an elastically deformable, cylindrical or tubular inner body 6' or tube portion 7' that spontaneously elastically straightens into its starting shape. During manufacture, the dumbbell-shaped balloon component 3' has already been formed to its complete dimensions necessary for the rectal retention. The balloon component has a central taper 25b' that is placed within the anal canal, the distal end-position expansion 25a' of the dumbbell in the rectum and the proximal end-position expansion 25c' coming to rest directly in the preanal region. In the filled state, the orifice 4' of the tubular inner body 6' directed toward the rectum does not protrude beyond the distal radius R of the balloon component 3' mounted on the inner body 6'. The extracorporeally fillable head unit 5' in the proximal direction merges into a stool-discharging tube portion that connects the head unit 5' to an extracorporeal container.

Figure 10B:
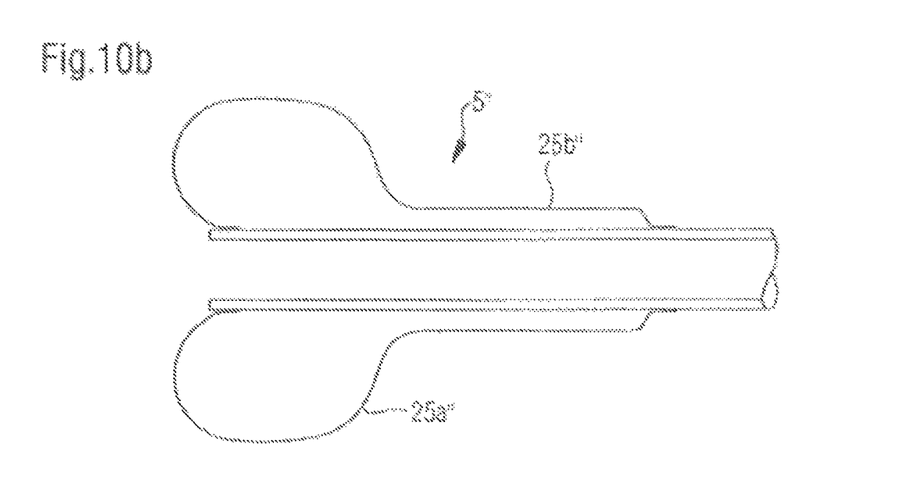

FIG. 10b shows a design of a head unit 5" that is derived from FIG. 10a, the balloon component 3" having a mushroom shape and dispensing with a preanal expansion at the proximal end position, and instead having only a distal, radially expanded region 25a" and a proximally adjoining radially tapered region 25b". The proximal, transanally positioned segment 3b" optionally extends into the anal canal or through the anal canal, or protrudes beyond the opening of the anus.

Figure 10C:
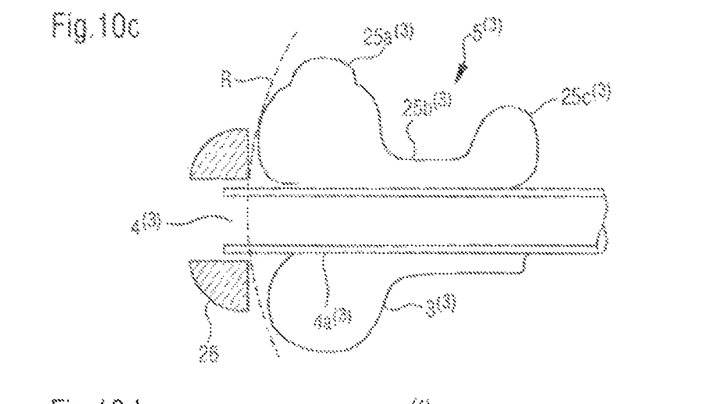

FIG. 10c contains a design of a head unit $5^{(3)}$, likewise derived from FIGS. 10a and 10b, including a balloon component $3^{(3)}$ in which in the filled state, the orifice $4^{(3)}$ of the tubular inner body $4a^{(3)}$ directed toward the rectum protrudes beyond the distal radius R of the balloon component $3^{(3)}$ mounted on the inner body $4a^{(3)}$. The end of the inner body $4a^{(3)}$ that freely extends into the rectum is preferably bordered by a particularly soft cap-like or olive-like element 26 in a manner that provides lateral and frontal protection.

Figure 10D:
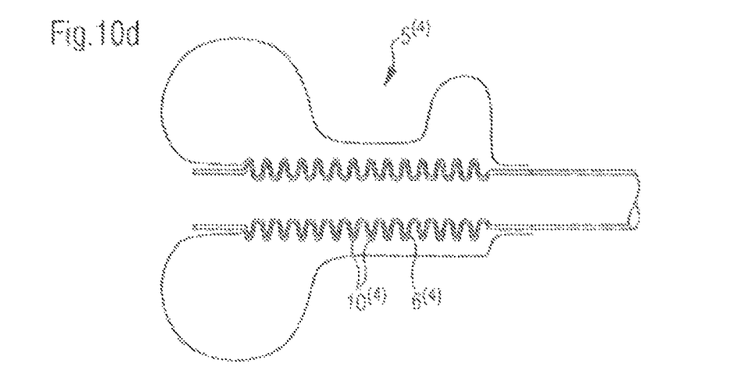

FIG. 10d discloses another modified design of a head unit $5^{(4)}$ according to the invention, the inner body $6^{(4)}$ that carries the dumbbell- or mushroom-shaped balloon $3^{(4)}$ having an undulating, ring-shaped or spiral-shaped profile 10⁽⁴⁾ which may be integrated into the rectal segment and into the transanal segment, and also into both segments of the head unit 5⁽⁴⁾, and which thus advantageously modifies the elastic deformation and straightening properties of the balloon-carrying inner body 6⁽⁴⁾ in that the radial deformation and straightening take place in a speeded-up, particularly prompt manner. The structural geometric design of the undulating profile 10⁽⁴⁾ may be varied segment by segment. For example, the undulating profile 10⁽⁴⁾ in the area of the rectally positioned segment of the head unit 5⁽⁴⁾ may be formed in such a way that the lumen-maintaining or -straightening effect of the undulation 10⁽⁴⁾ outweighs the corresponding effect in the transanal segment of the head unit 5⁽⁴⁾, which in the rectal segment contributes toward stabilization of the orifice area with respect to the rectum, and in the transanal segment sets the deformation and straightening properties in such a way that with normal sphincter muscle tonus the shaft inner body 6⁽⁴⁾ folds radially inwardly, and with decreasing tonus promptly elastically progresses into the opening anal canal.

Figure 10E:
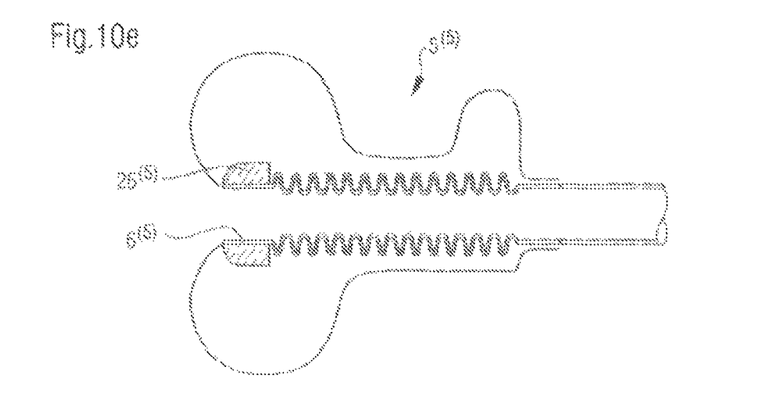

FIG. 10e shows a design of a head unit 5⁽⁵⁾ according to the invention that is derived from FIG. 10d, in which the rectal segment of the inner body 6⁽⁵⁾ is supplemented by a lumen-stabilizing ring- or sleeve-like element 26⁽⁵⁾ of the head unit 5⁽⁴⁾ according to the invention, which is flatly connected to the inner or outer surface of the rectal segment of the inner tube 6⁽⁵⁾.

Figure 10F:
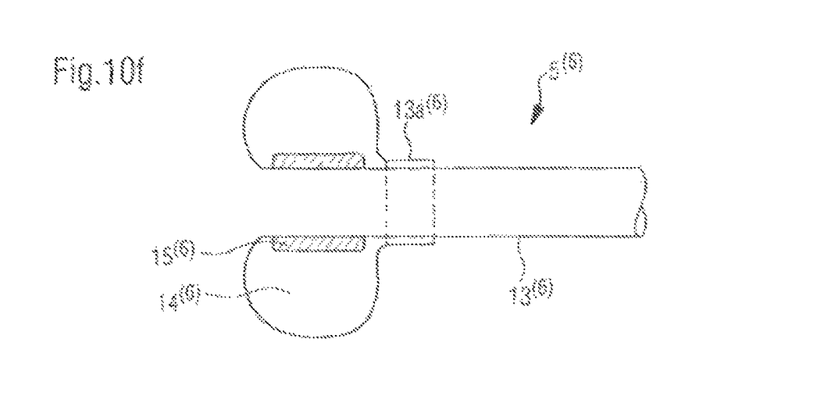

FIG. 10f shows one particularly simple design of a stool-discharging head unit 5⁽⁶⁾, the one tapered end 13⁽⁶⁾ of a spherically or discoidally formed balloon tube component being sleeved through the other tapered end 13a⁽⁶⁾, and the two ends 13⁽⁶⁾, 13a⁽⁶⁾ being flatly connected to one another with tight sealing with respect to the fillable compartment 14⁽⁶⁾, which thus forms a balloon anchor that is placeable in a body interior space and has a retaining effect. The rectal segment is equipped with a ring- or sleeve-like element 15⁽⁶⁾ for stabilizing the stool-receiving orifice.

Figure 10G:
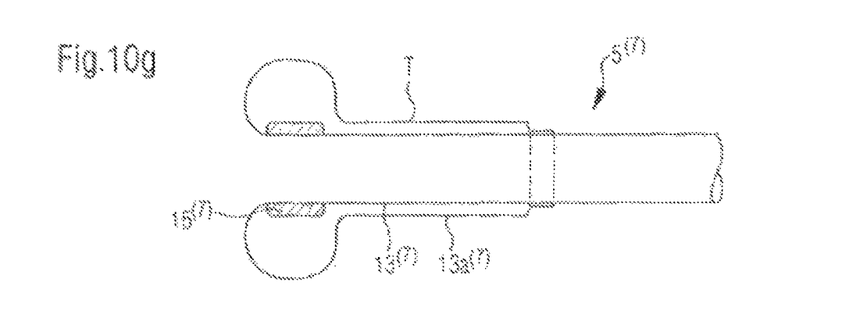

FIG. 10g depicts a design of a stool-discharging head unit 5⁽⁷⁾ that is derived from FIG. 10f, in which the two tapered balloon ends 13⁽⁷⁾ and 13a⁽⁷⁾ are guided into the anal canal, or also through same. In the transanal segment T, the two balloon ends 13⁽⁷⁾, 13a⁽⁷⁾ are then in a concentric arrangement. No further lumen-straightening element is installed in the transanal segment T. Here as well, the rectal segment may be provided with a ring- or sleeve-like element 15⁽⁷⁾ for stabilizing the stool-receiving orifice.

Figure 10H:
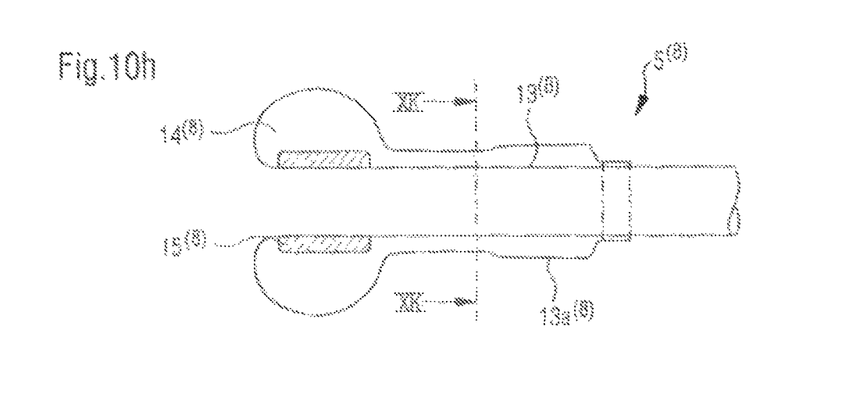

FIG. 10h shows one embodiment of a stool-discharging head unit 5⁽⁸⁾ derived from FIG. 10g, in which the two concentric, transanally positioned balloon ends 13⁽⁸⁾, 13a⁽⁸⁾ are connected to one another via longitudinally extending, web-like welds 27 that are uniformly distributed over the circumference of the segment. If a displacement of volume from the rectal segment of the fillable compartment 14⁽⁸⁾ into the transanal segment occurs, this compartment stands upright in the manner of an air mattress and thus frees up the delivering and/or discharging lumen. The rectal segment may once again be provided with a ring- or sleeve-like element 15⁽⁸⁾ for stabilizing the stool-receiving orifice.

Figure 10I:
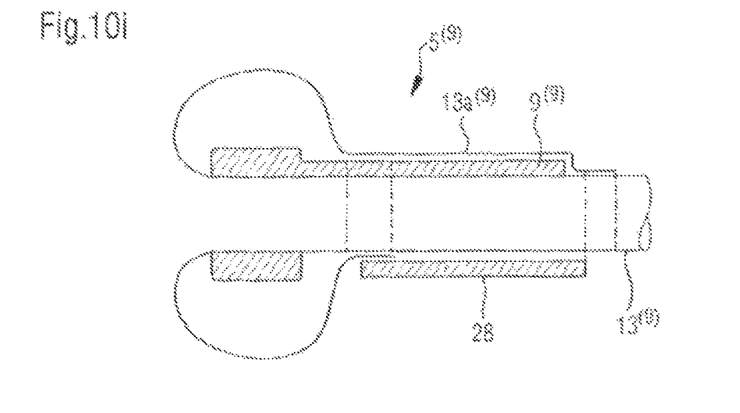

FIG. 10i shows a stool-discharging head unit 5⁽⁹⁾ as a structural supplement to FIG. 10g, in which one or more elastically deformable, lumen-stabilizing, sleeve- or ring-like components 9⁽⁹⁾, 28 on the outer surface and/or inner surface of the inner layer of the two concentric layers 13⁽⁹⁾, 13a⁽⁹⁾ are installed in the transanal segment, which on the one hand straighten the transanal segment into the open sphincter muscle, and which on the other hand resist the filling pressure prevailing in the fillable compartment and prevent an undesirable collapse of the delivering and/or discharging lumen.

Figure 10J:
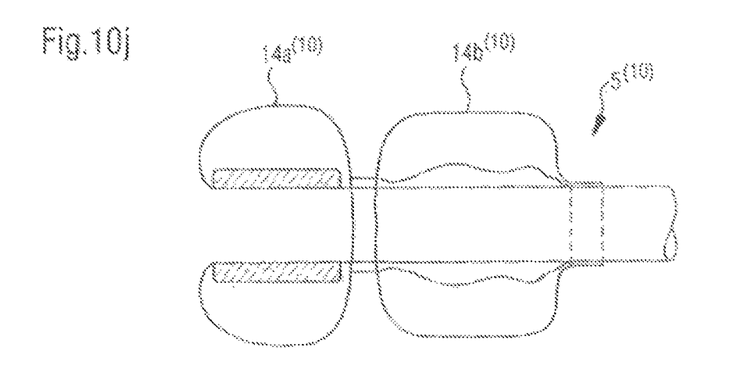
Figure 10K:
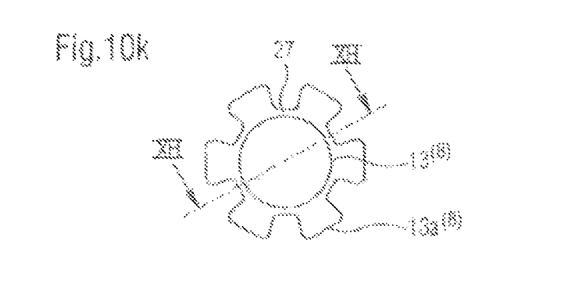
FIG. 10k shows a cross section of FIG. 10h along the line XK-XK.

FIG. 10j illustrates a further design of a head unit 5⁽¹⁰⁾ in which the rectal segment and the transanal segment are structurally separate, or two separately fillable compartments 14a⁽¹⁰⁾ and 14b⁽¹⁰⁾ are lined up in a row, the transanal segment preferably being made up of two concentric tube layers which at the end position are welded to the closed fillable space, and the rectally placed compartment 14a⁽¹⁰⁾ having a function that anchors the head unit 5⁽¹⁰⁾, and the transanal segment having a function that seals the anal canal and at the same time closes the delivering and/or discharging lumen. During temporary filling of the transanal compartment, this particular design allows particularly powerful, efficient transanal seal performance. When the compartment is evacuated, the two tube layers are situated close to one another and completely open up the lumen of the head unit.

LIST OF REFERENCE NUMERALS 1 catheter-like device
2 tube-like segment
2a tube segment
2b tube segment
2c connector element
3 balloon body, balloon segment
3a balloon segment
3b balloon segment
4 orifice
4a sleeve-like component
5 head unit
6 inner body
7 tube portion, tube segment
8 head part
9 inner body
10 undulating profile
11 tube segment
12 component
13 tube body
13a distal end
14 expansion, compartment
15 sleeve element
17 segment
17a corrugation
17b portion
18 profile, PUR layer
19 barrier layer
20 PVC layer
21 PA layer
22 adhesive layer
23 LPDE layer
24 carrier layer
25a distal expansion
25b central taper
25c proximal expansion
26 olive-like element
27 weld
28 component

The invention claimed is:

1. A catheter-like device (1) for the medical delivery and/or discharge of substances that are particularly odor-intensive, particularly soluble, or otherwise capable of migration, comprising a balloon component (3, 3a) that anchors and retains a device (1) that is placed in an organ or in a body interior space, a delivering and/or discharging tube unit (2a) that adjoins the balloon component (3, 3a) and leads transluminally to the organ or to the interior space, and an extracorporeally adjoining tube-like portion (2), characterized in that at least the extracorporeal tube-like portion (2) is formed from a multilayer film, the multilayer film including at least one barrier layer (19) made of an odor-proof barrier material and at least one carrier layer (24) made of some other, mechanically stable material, the wall thickness of the carrier layer (24) being greater than the wall thickness of the barrier layer (19), wherein one or more layers of the multilayer film material are coextruded with one another.

2. The device (1) according to claim 1, characterized in that in addition to the delivering and/or discharging extracorporeal tube-like portion (2), the inner body (6) that carries the balloon (3, 3a) and/or the balloon body (3, 3a) is manufactured from a multilayer film material containing at least one odor-proof barrier layer (19).

3. The device (1) according to claim 1, characterized in that the barrier layer (19) is made of ethylene-vinyl alcohol copolymer (EVOH) and/or polyvinylidene chloride (PVDC).

4. The device (1) according to claim 1, characterized in that individual components of an intrarectal head unit (5, 8) and of the extracorporeal tube unit (2) are manufactured or formed from separate tube blanks in separate manufacturing steps.

5. The device (1) according to claim 1, characterized in that in addition to the extracorporeal tube unit (2), the tube inner body (6) that carries the balloon (3, 3a) and optionally also the balloon component (3, 3a) is made of a multilayer, odor-proof film material that is provided with proportional barrier layers (19) made of EVOH and/or PVDC, the corresponding portions of the device (1) being manufactured from a single tube blank.

6. The device (1) according to claim 1, characterized in that a shaft tube component of a head unit (5, 8) of the device (1) is formed with a specific profile and/or reinforced or modified with additional structural components in such a way that elastic deformation and straightening properties result which ensure that the shaft tube, when subjected to a balloon filling pressure of at least 50 mbar outside the body, forms no radially inwardly directed deformations of the tube profile.

7. The device (1) according to claim 1, characterized in that the multilayer film material is made up of a sandwich-like combination, at least one central barrier layer (19) being enclosed on both sides by at least one carrier layer (24) each.

8. The device (1) according to claim 1, characterized in that the odor-proof barrier layer (19) made of EVOH and/or PVDC is embedded in the layer composite of the film blanks, between a layer (18) made of polyurethane (PUR) and a layer (20) made of polyvinyl chloride (PVC).

9. The device (1) according to claim 1, characterized in that the odor-proof barrier layer (19) made of EVOH and/or PVDC is embedded in the layer composite of the film blanks, between a layer (21) made of polyamide (PA) and a layer (20) made of PVC.

10. The device (1) according to claim 1, characterized in that the odor-proof barrier layer (19) made of EVOH and/or PVDC is embedded between an outer layer and an inner layer (18) made of PUR.

11. The device (1) according to claim 1, characterized in that the odor-proof barrier layer (19) made of EVOH and/or PVDC is combined with a single carrier layer (24) made of PUR, PVC, or also PA or a thermoplastic polyamide elastomer (TPE-A).

12. The device (1) according to claim 1, characterized in that the PUR layers (18) inserted into the particular film combinations are made of polyurethanes having Shore hardnesses of 80A to 95A and 55D to 65D.

13. The device (1) according to claim 1, characterized in that the odor-inhibiting barrier layers (19), in combination with the carrier layers (24), in each case have wall thicknesses of 5 to 20 μm.

14. The device (1) according to claim 1, characterized in that one or more components of the catheter-like device (1) are adhered to one another.

15. The device (1) to claim 14, according characterized in that the one or more components of the catheter-like device (1) are adhered to one another by allowing two surface regions, adjacently situated for the joining, of the components to be joined to become adhered using a solvent.

16. The device (1) according to claim 15, characterized in that the one or more components of the catheter-like device (1) are adhered to one another by allowing two surface regions, adjacently situated for the joining, of the components to be joined to become adhered using cyclohexanone or tetrahydrofuran as the solvent.

17. The device (1) according to claim 1, characterized in that at least one barrier layer (19), or a barrier layer (19) made of EVOH, is joined to a neighboring layer (21) made of PA.

18. The device (1) according to claim 17, characterized in that at least one barrier layer (19), or the barrier layer (19) made of EVOH, is joined to a neighboring layer (21) made of PA without a connecting, adhesion-assisting tie layer.

19. The device (1) according to claim 1, characterized in that at least one carrier layer (24), or a carrier layer (24) made of PUR, is joined to a neighboring layer (21) made of PA.

20. The device (1) according to claim 19, characterized in that at least one carrier layer (24), or the carrier layer (24) made of PUR, is joined to a neighboring layer (21) made of PA without a connecting, adhesion-assisting tie layer.

21. The device (1) according to claim 1, characterized in that a layer (21) made of PA is joined to a PE-based layer (23) by use of an adhesion promoter (22) as an intermediate layer.

22. The device (1) according to claim 1, characterized in that the (overall) thickness dr of the carrier layer (24) or of all carrier layers (24) is greater than or equal to five times the (overall) thickness de of the barrier layer (19) or of all barrier layers (19):

$$d_T \geq 5*d_B,$$

or that the (overall) thickness dr of the carrier layer (24) or of all carrier layers (24) is greater than or equal to ten times the (overall) thickness de of the barrier layer (19) or of all barrier layers (19):

$$d_T \geq 10*d_B,$$

or that the (overall) thickness dr of the carrier layer (24) or of all carrier layers (24) is greater than or equal to twenty times the (overall) thickness de of the barrier layer (19) made of EVOH or PVDC or of all barrier layers (19) made of EVOH and/or PVDC:

$$d_T \geq 20*d_B,$$

or that the (overall) thickness dr of the carrier layer (24) or of all carrier layers (24) is greater than or equal to forty times the (overall) thickness de of the barrier layer (19) made of EVOH or PVDC or of all barrier layers (19) made of EVOH and/or PVDC:

$$d_T \geq 40*d_B.$$

23. A catheter-like device (1) for the medical delivery and/or discharge of substances that are particularly odor-intensive, particularly soluble, or otherwise capable of migration, comprising a balloon component (3, 3a) that anchors and retains a device (1) that is placed in an organ or in a body interior space, a delivering and/or discharging tube unit (2a) that adjoins the balloon component (3, 3a) and leads transluminally to the organ or to the interior space, and an extracorporeally adjoining tube-like portion (2), characterized in that at least the extracorporeal tube-like portion (2) is formed from a multilayer tubular film blank including at least one barrier layer (19) made of an odor-proof barrier material and at least one carrier layer (24) made of some other, mechanically stable material, wherein the at least one barrier layer (19) and the at least one carrier layer (24) of the multilayer tubular film blank are coextruded with one another in such a way that the wall thickness of the carrier layer (24) is greater than the wall thickness of the barrier layer (19).

24. A catheter-like device (1) for the medical delivery and/or discharge of substances that are particularly odor-intensive, particularly soluble, or otherwise capable of migration, comprising a balloon component (3, 3a) that anchors and retains a device (1) that is placed in an organ or in a body interior space, a delivering and/or discharging tube unit (2a) that adjoins the balloon component (3, 3a) and leads transluminally to the organ or to the interior space, and an extracorporeally adjoining tube-like portion (2), characterized in that at least the extracorporeal tube-like portion (2) is formed from a multilayer tubular film blank including at least one barrier layer (19) made of an odor-proof barrier material and at least one carrier layer (24) made of a mechanically stable material from the group consisting of thermoplastic polyurethanes (TPU), polyvinyl chloride (PVC), polyamide (PA) or polyether block amide (PEBAX), wherein the at least one barrier layer (19) and the at least one carrier layer (24) are coextruded with one another in such a way that the wall thickness of the carrier layer (24) is greater than the wall thickness of the barrier layer (19) and that the overall thickness dr of the carrier layer (24) or of all carrier layers (24) is greater than or equal to five times the overall thickness de of the barrier layer (19) or of all barrier layers (19):

$$d_T \geq 5 * d_B.$$

* * * * *